US010605188B2

(12) United States Patent
Matsumoto et al.

(10) Patent No.: US 10,605,188 B2
(45) Date of Patent: Mar. 31, 2020

(54) CONTROL DEVICE, CONTROL METHOD, AND CONTROL PROGRAM

(71) Applicant: Hitachi, Ltd., Tokyo (JP)

(72) Inventors: Kohsei Matsumoto, Tokyo (JP);
Kanako Esaki, Tokyo (JP); Kiyoto Ito, Tokyo (JP); Hiroto Naito, Tokyo (JP);
Yuzo Shirakawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/258,756

(22) Filed: Jan. 28, 2019

(65) Prior Publication Data

US 2019/0242319 A1    Aug. 8, 2019

(30) Foreign Application Priority Data

Feb. 6, 2018   (JP) ................................ 2018-019147

(51) Int. Cl.
*F02D 41/14*    (2006.01)
*F02D 41/24*    (2006.01)
*F02D 35/02*    (2006.01)
*G06N 3/08*    (2006.01)
*G07C 5/08*    (2006.01)
(Continued)

(52) U.S. Cl.
CPC ....... *F02D 41/1405* (2013.01); *F02D 35/023* (2013.01); *F02D 35/024* (2013.01); *F02D 41/1404* (2013.01); *F02D 41/2451* (2013.01); *F02D 41/2454* (2013.01); *F02D 41/2461* (2013.01); *F02D 41/2477* (2013.01); *G05B 23/00* (2013.01); *G06N 3/08* (2013.01); *G06N 3/088* (2013.01); *G07C 5/0816* (2013.01);
*F02D 35/027* (2013.01); *F02D 2041/288* (2013.01); *G06F 17/14* (2013.01)

(58) Field of Classification Search
CPC ............. F02D 41/1404; F02D 41/1405; F02D 41/2451; F02D 41/2454; F02D 41/2461; F02D 41/2477; G06N 3/088; G07C 5/0816
USPC .......................................... 701/106; 123/674
See application file for complete search history.

(56) References Cited

U.S. PATENT DOCUMENTS 5,093,792 A  *  3/1992  Taki .................... F02D 35/023
                                          701/111
6,957,172 B2 * 10/2005  Wegerich .......... G06K 9/00536
                                          702/189
(Continued)

FOREIGN PATENT DOCUMENTS

JP        2009-167968 A     7/2009

*Primary Examiner* — Erick R Solis
(74) *Attorney, Agent, or Firm* — Mattingly & Malur, PC

(57) ABSTRACT

The control device includes: an observation unit that calculates an amount relating to a state of a control target detected by a sensor; an abnormality predictor detection unit that detects an abnormality predictor of the control target; a reward calculation unit that calculates a reward which is an amount obtained by evaluating pass or fail of an operation of the control target; a basic control amount calculation unit that calculates data relating to the state during an operation and a basic control amount serving as a reference to control the control target; a control amount search unit that searches for a control amount at which the reward satisfies a predetermined condition based on the basic control amount, the data relating to the state during the operation and the reward; and a control unit that generates a command value to the control target.

9 Claims, 7 Drawing Sheets

(51) Int. Cl.
  *G05B 23/00*  (2006.01)
  *G06F 17/14*  (2006.01)
  *F02D 41/28*  (2006.01)

(56) References Cited

U.S. PATENT DOCUMENTS

| | | | | |
|---|---|---|---|---|
| 8,275,577 | B2* | 9/2012 | Herzog | F22B 37/10 |
| | | | | 702/183 |
| 9,429,096 | B2* | 8/2016 | Hellstrom | F02D 35/025 |
| 2018/0053085 | A1* | 2/2018 | Matsumoto | G06N 3/084 |
| 2019/0149565 | A1* | 5/2019 | Hagi | G06N 5/022 |
| | | | | 726/23 |
| 2019/0294972 | A1* | 9/2019 | Keller | G06N 3/0445 |
| 2019/0339687 | A1* | 11/2019 | Cella | G05B 23/0221 |

* cited by examiner

FIG. 7

| | CONTROL AMOUNT 0 (501) | CONTROL AMOUNT 1 (502) | ... | CONTROL AMOUNT N (507) |
|---|---|---|---|---|
| STATE 0 | EVALUATION VALUE 00 | EVALUATION VALUE 01 | ... | EVALUATION VALUE 0N |
| STATE 1 | EVALUATION VALUE 10 | EVALUATION VALUE 11 | ... | EVALUATION VALUE 1N |
| ⋮ | ⋮ | ⋮ | | ⋮ |
| STATE M | EVALUATION VALUE M0 | EVALUATION VALUE M1 | ... | EVALUATION VALUE MN |

CONTROL DEVICE, CONTROL METHOD, AND CONTROL PROGRAM

BACKGROUND OF THE INVENTION

1. Field of the Invention

The present invention relates to a control device, a control method, and a control program.

2. Description of the Related Art

Conventionally, there are various techniques of controlling a control target such as an engine using a neural network. For example, JP 2009-167968 A discloses a device that uses a neural network to calculate engine control parameters such as an engine rotation speed and an intake air pressure and controls an engine.

SUMMARY OF THE INVENTION

In recent years, power generation systems responding to region-specific fuel circumstances, such as gases produced in developing countries and biofuels from surplus agricultural products, have been required as a means for self-sustaining regional energy. For such a purpose, it is necessary to make a power generation engine to respond to fuel that is easily available for each region. However, manual work to adjust control parameters such as an ignition timing and an air-fuel ratio is extremely difficult and cumbersome, which leads to high cost. Thus, there has been a demand for a technique of reducing the time and effort for adjusting control parameters necessary for power generation. An object of the present invention is to provide a control device, a control method, and a control program capable of reducing the time and effort of adjusting a control parameters necessary for power generation.

The present invention is configured as a control device including: an observation unit that calculates an amount relating to a state of a control target detected by a sensor based on the state; an abnormality predictor detection unit that detects an abnormality predictor of the control target based on an output obtained at a time when the amount relating to the state is input to a detection learning model; a reward calculation unit that calculates a reward which is an amount obtained by evaluating pass or fail of an operation of the control target based on a detection result of the abnormality predictor; a basic control amount calculation unit that calculates data relating to the state during an operation and a basic control amount serving as a reference to control the control target by inputting the data on the state during the operation into a calculation learning model; a control amount search unit that searches for a control amount at which the reward satisfies a predetermined condition based on the basic control amount, the data relating to the state during the operation and the reward and outputs the searched control amount and the control amount to execute control in accordance with the control amount; and a control unit that generates a command value to the control target based on the searched control amount and the control amount to execute control in accordance with the control amount.

In addition, the present invention can be also grasped as a control method and a control program performed by the above control device.

According to the present invention, it is possible to reduce the time and effort for adjusting the control parameter necessary for power generation.

BRIEF DESCRIPTION OF THE DRAWINGS

FIG. 7 is an example of a search space.

DESCRIPTION OF THE PREFERRED EMBODIMENTS

Hereinafter, modes for implementing a control device, a control method, and a control program according to the present embodiment will be described in detail with reference to the accompanying drawings. In the present embodiment, a description will be given by exemplifying an engine as a control target of the control device, but various prime movers and pumps including a motor and a turbine, or a moving object such as a vehicle, a ship, and a robot in which these motor and turbine are incorporated can be similarly applied as the control target. Hereinafter, it is considered a method of controlling an engine to improve thermal efficiency in a control system that includes a system including the engine, a sensor configured to measure a state of the system, and a controller that applies a command value to the system based on data obtained from the sensor.

Figure 1:
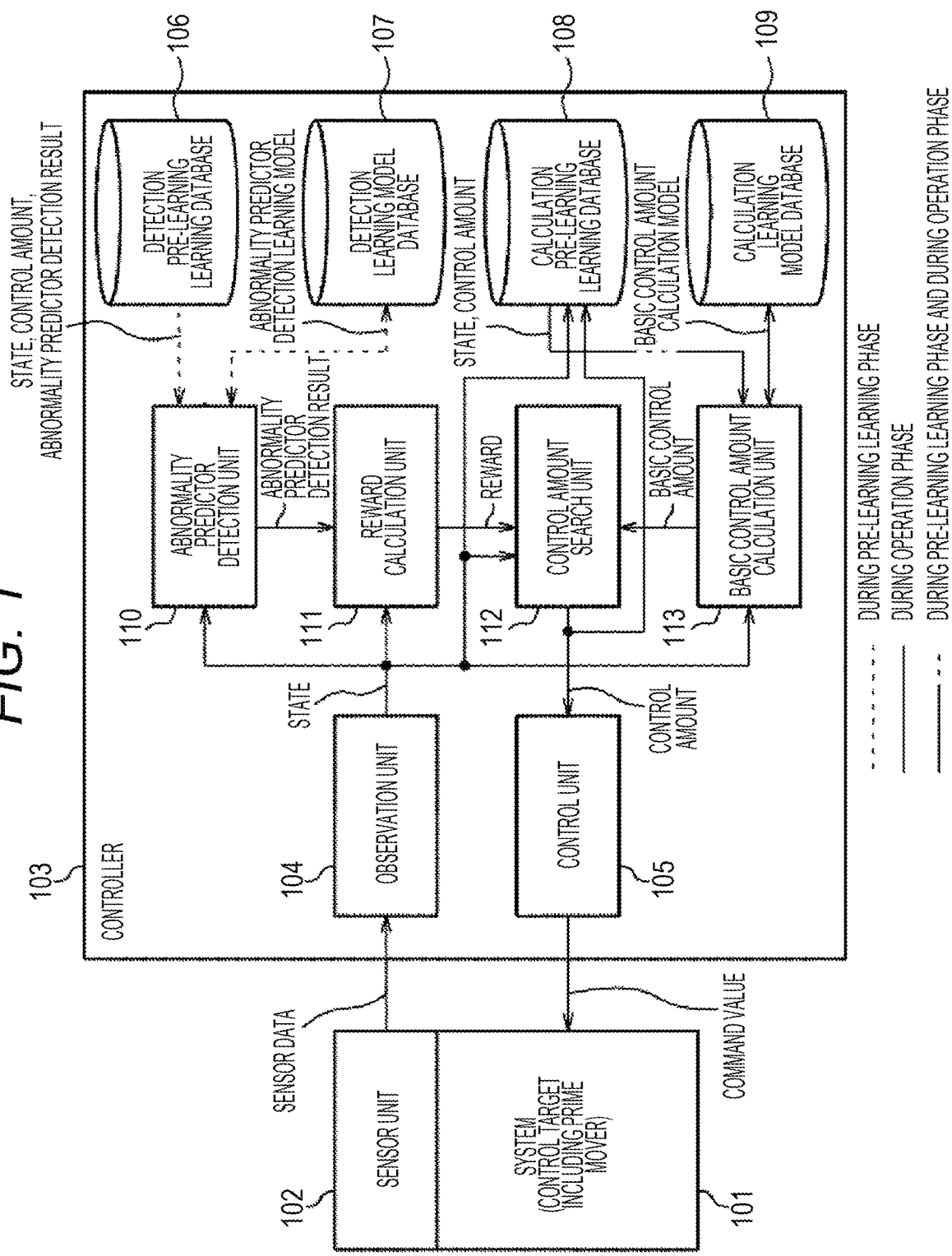
FIG. 1 is a configuration diagram of an entire system.

FIG. 1 illustrates an overall configuration. A system 101 includes a prime mover and an object that is operated by the prime mover, and it is assumed that an engine is used as the prime mover here. In addition, a sensor unit 102 includes a sensor configured to measure a state of the system 101 including the engine. Here, it is assumed that the sensor unit 102 includes sensors capable of measuring a hydrogen flow rate, rotation speed, torque, and an in-cylinder pressure. In addition, it is assumed that a controller 103 is connected to the sensor unit 102 and the system 101, and sensor data is input from the sensor unit 102, and a command value can be output to the system 101.

In addition, it is assumed that the controller 103 has a plurality of functions. Specifically, the controller 103 includes: an observation unit 104 that obtains input of a plurality of pieces of sensor data, and then, calculates an amount relating to the state of the system 101 based on the input; a reward calculation unit 111 that calculates an amount (hereinafter, a reward), obtained by evaluating pass or fail of an operation of the system 101 based on the state of the system 101 obtained by the observation unit 104 and presence or absence (hereinafter, an abnormality predictor detection result) of a predictor of an abnormality of the system 101 or the engine constituting the system 101 detected by an abnormality predictor detection unit 110; the abnormality predictor detection unit 110 that learns detection of a predictor of an abnormality based on a detection pre-learning database 106 for detection of an abnormality predictor and calculates the abnormality predictor detection result based on such a learning result; a basic control amount calculation unit 113 that performs learning for calculation of a control amount (hereinafter, a basic control amount), which serves as a reference when searching for a control amount based on a calculation pre-learning database 108, and calculates the basic control amount based on such a learning result; a control amount search unit 112 that searches for a control amount of the system that allows an increase of the reward based on the basic control amount obtained from the basic control amount calculation unit 113 and outputs a control amount to control the system 101 in accordance with the searched control amount; and a control unit 105 that outputs a command value to the prime mover corresponding to the control amount output by the control amount search unit 112.

In addition, the controller 103 stores the detection pre-learning database 106 used for learning of the abnormality predictor detection unit 110; a detection learning model database 107 for abnormality predictor detection that holds the learning result of the abnormality predictor detection unit 110, the calculation pre-learning database 108 for basic control amount calculation used for learning of the basic control amount calculation unit 113, and a calculation learning model database 109 for basic control amount calculation that holds the learning result of the basic control amount calculation unit 113.

Although not illustrated here, the controller 103 is configured using a general computer such as personal computer (PC) as hardware, and includes each unit such as a central processing unit (CPU), a memory, an external storage device, a communication interface (I/F), an output device, and an input device. These units constituting the controller 103 are electrically connected by an internal communication line such as an internal bus.

The CPU realizes various functions of the controller 103 by reading out various programs stored in the external storage device and loading and executing the read programs on the memory. The memory is configured using, for example, a random access memory (RAM) capable of reading and writing data, and the above-described various programs are loaded by the CPU. The external storage device is configured using, for example, a storage medium such as a read only memory (ROM), a storage device such as a hard disk drive (HDD), a solid state drive (SSD), or the like, and stores the various programs necessary for processing of the controller 103.

Incidentally, the above-described various programs may be downloaded from a network to the external storage device via the communication I/F, loaded on the memory, and executed by the CPU. In addition, the above-described various programs may be directly loaded from the storage medium onto the memory via a reading/writing device, which reads and writes information from and into a storage medium readable by a portable computer such as a compact disk (CD) and a digital versatile disk (DVD), and executed by the CPU.

In addition, the above-described various programs may be provided in the state of being recorded on the storage medium in a file of a format that can be installed in a computer or an executable format. Further, the above-described various programs may be stored in a computer connected to a communication network and provided by being downloaded via the network.

Here, it is assumed that the respective units of the controller 103 is mounted as software, but all or some of the units may be mounted as hardware. In addition, the respective units except for the sensor unit 102 may be provided in remote places where communication with the controller 103 is possible. In addition, the hardware and software constituting each of the above units may be selected or omitted in response to an embodiment.

In addition, a combustion pressure sensor is assumed here as the sensor capable of measuring the in-cylinder pressure, but another sensor may be used as long as the sensor is capable of measuring an amount correlated with the in-cylinder pressure. For example, a strain sensor installed in the engine may be used, or a microphone or a vibration sensor capable of measuring a change of the in-cylinder pressure as sound or vibration may be used. Alternatively, if a change of the in-cylinder pressure can be measured using cameras capable of measuring a change of heat, these cameras may be used.

In the control system illustrated above, two phases of a pre-learning phase and an operation phase are assumed as stages of processing when the engine is controlled.

Here, the pre-learning phase indicates a stage in which the abnormality predictor detection unit 110 and the basic control amount calculation unit 113 enable detection of an abnormal predictor and calculation of a control amount by learning using learning data prepared in advance. In addition, the operation phase indicates a stage in which the engine is controlled using the abnormality predictor detection unit 110 and the basic control amount calculation unit 113 that have been subjected to pre-learning.

First, the pre-learning phase will be described. In the pre-learning phase, learning using a database is performed for each of the abnormality predictor detection unit 110 and the basic control amount calculation unit 113.

Figure 2:
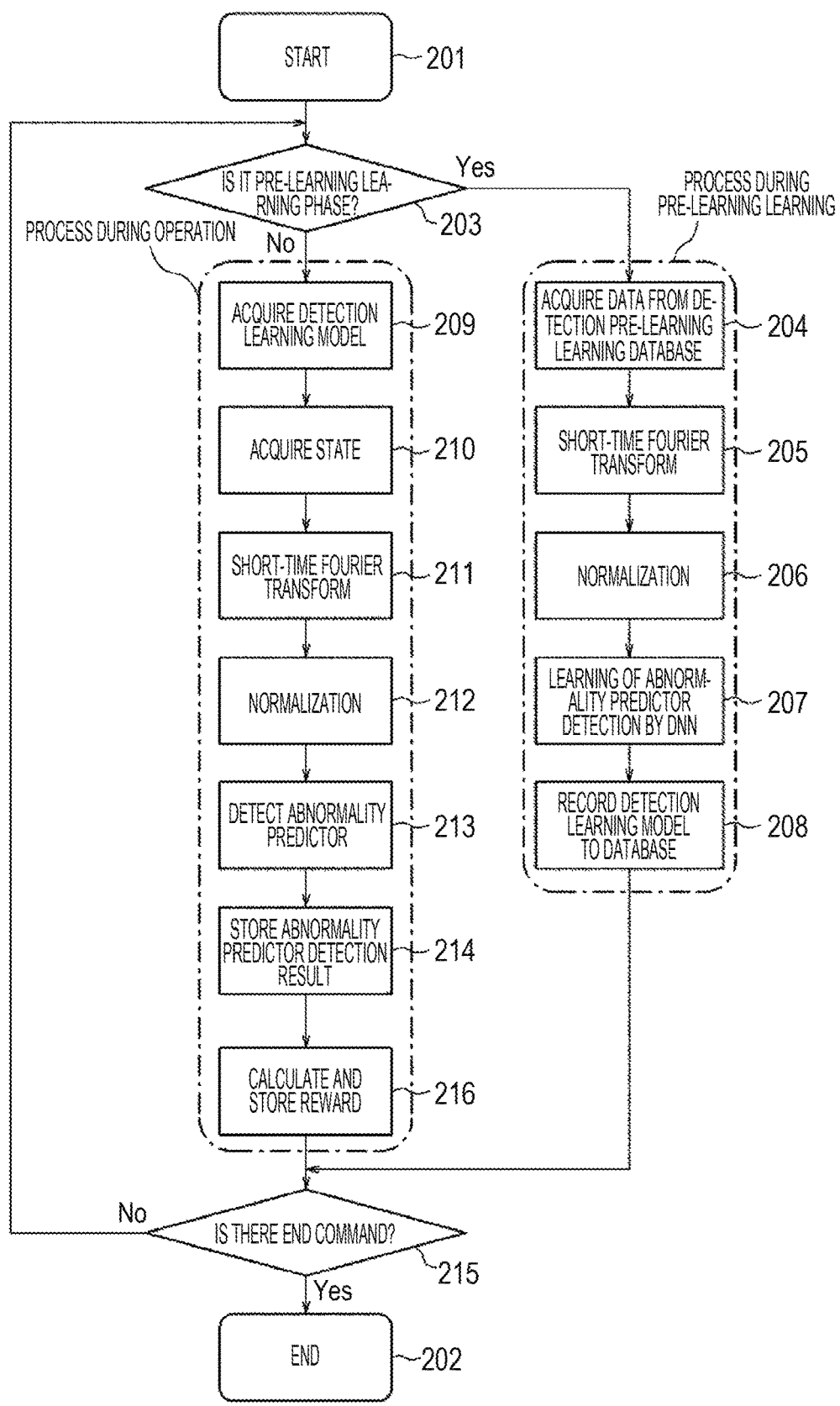
FIG. 2 is a flowchart illustrating a procedure of a process executed by an abnormality predictor detection unit.

First, the processing of the abnormality predictor detection unit 110 will be described. The predictor of the abnormality here is defined depending on a system serving as a control target. Here, the control of the engine is assumed, and knocking accompanying abnormal combustion is defined as an abnormality, and disturbance of an in-cylinder pressure waveform due to the knocking (noise added to a normal in-cylinder pressure waveform) is defined as the predictor of the abnormality. The processing of the abnormality predictor detection unit 110 is illustrated in FIG. 2 on the basis of such definitions. When receiving an instruction to start a process of detecting an abnormality predictor via the input device or the like (step 201), the controller 103 executes a selection process to determine whether it is the pre-learning phase or the operation phase (step 203). When the controller 103 determines that it is the pre-learning phase (step 203; Yes), the abnormality predictor detection unit 110 acquires data from the detection pre-learning database 106 as step 204. On the other hand, when it is determined that the phase is not the pre-learning phase (step 203; No), the controller 103 executes processes of step 209 and the subsequent steps, and these processes will be described later.

Figure 3:
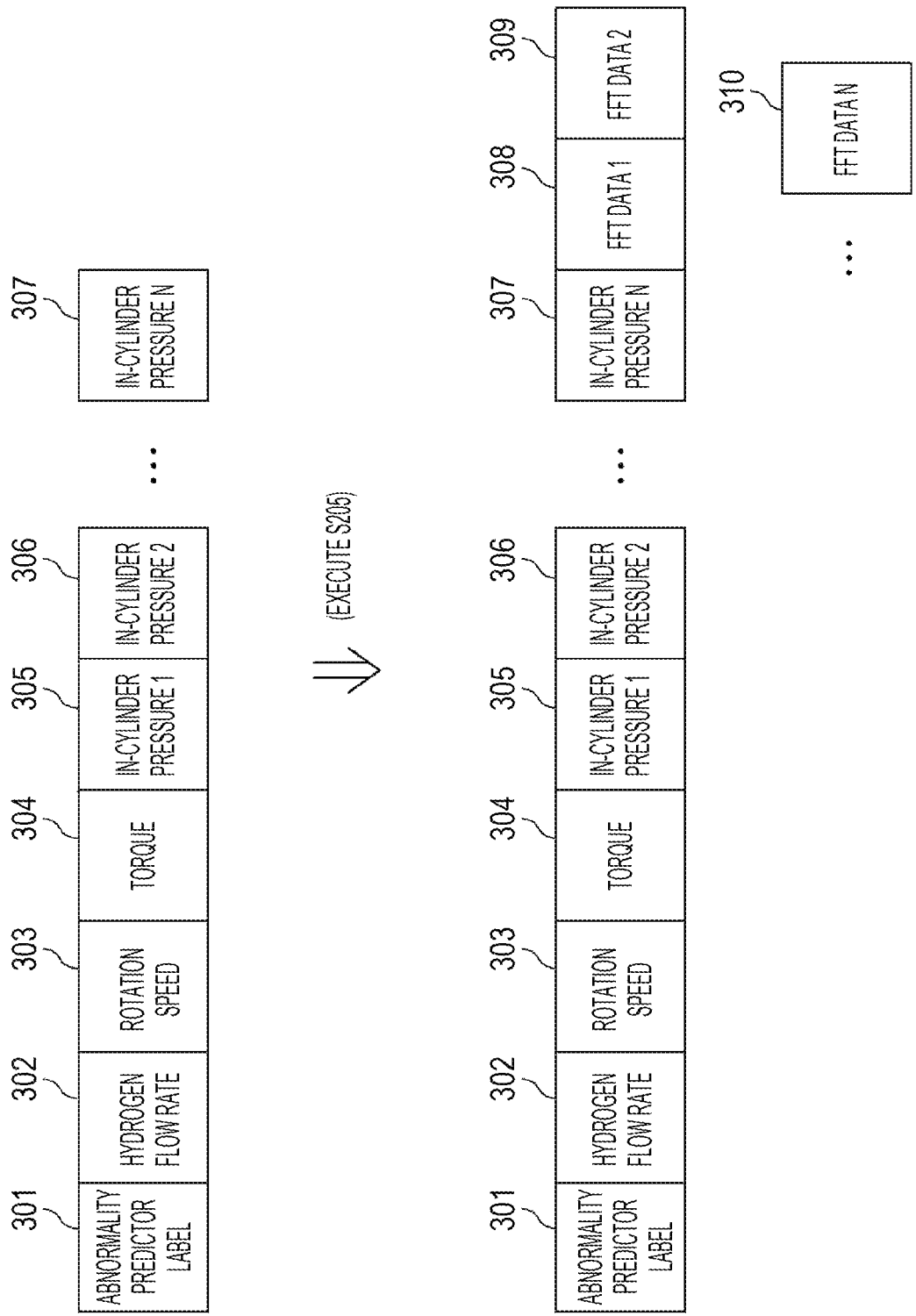
FIG. 3 is an example of detection pre-learning database (DB)

Here, a data example of the detection pre-learning database 106 is illustrated in FIG. 3. As illustrated in the upper part of FIG. 3, an abnormality predictor label 301 and data 302 to 307 representing states of the engine are stored in association with each other as data stored in the detection pre-learning database 106. The state data is data obtained by measuring the engine in the system 101 with the sensor unit 102. The state data records data corresponding to temporal changes in combustion pressure for one cycle of combustion of the engine, such as a hydrogen flow rate 302, rotation speed 303, torque 304, an in-cylinder pressure 305 to an in-cylinder pressure 307 (in-cylinder pressures 1 to N), as data for each cycle of combustion of the engine. In addition, the abnormality predictor label 301 indicating whether presence or absence of an abnormality predictor of the system 101 or the engine constituting the system 101 when this data is obtained is recorded. For example, "1" is set to the abnormality predictor label 301 when the state data stored in association with the abnormality predictor label 301 corresponds to the abnormality predictor, and "0" is set otherwise. The setting of the abnormality predictor label 301 will be described later.

Although only one cycle of combustion of the engine is illustrated in the state data 302 to 307, it is assumed that state data corresponding to a plurality of cycles obtained by preliminary trial operations or the like is recorded in the database in the same manner.

Next, in the pre-learning phase, the abnormality predictor detection unit 110 performs learning of the process of detecting the abnormality predictor using the detection pre-learning database 106. At this time, the state data is converted into data in a frequency domain, and then, the learning process is performed, and a short-time Fourier transform is executed as the conversion processing into data in the frequency domain (step 205). More specifically, the abnormality predictor detection unit 110 sets time windows for the in-cylinder pressure data in the state data and executes the short-time Fourier transform for each of the set time windows. As a result, the abnormality predictor detection unit 110 obtains a power spectrum for each frequency band for each time window.

As a result, the abnormality predictor detection unit 110 stores, for example, data 308 to 310 (hereinafter, FFT data 1 to N) obtained by the short-time Fourier transformation for each of the in-cylinder pressures 1 to N as the state data, as illustrated in the lower part of FIG. 3, in association with the abnormality predictor label 301, the hydrogen flow rate 302, the rotation speed 303, the torque 304, and the in-cylinder pressure 305 to the in-cylinder pressure 307 (in-cylinder pressures 1 to N) illustrated in the upper part of FIG. 3. In this manner, the abnormality predictor detection unit 110 stores data on the result of the short-time Fourier transform in the memory of the controller 103. Although it is assumed to use the short-time Fourier transform here as a conversion method into the data in the frequency domain, other methods may be used as long as the same effect can be obtained. For example, a wavelet transform may be used. Next, the abnormality predictor detection unit 110 executes a normalization process on the FFT data (step 206). As a result, sizes of data and the like are aligned according to a specific rule.

Next, the abnormality predictor detection unit 110 executes a process relating to learning of abnormality predictor detection by a deep neural network (DNN) (step 207). Herein, it is assumed that a neural network for classification is configured in the abnormality predictor detection unit 110. Here, a so-called learning process is performed by inputting the FFT data, obtained by the above-described processing from the in-cylinder pressure 305 to the in-cylinder pressure 307 (in-cylinder pressures 1 to N) of the state data, to the neural network, and using a difference between an output value obtained by the neural network based on this input and the abnormality predictor label 301 corresponding to the input FFT data to update the neural network such that this difference becomes small, thereby obtaining a model of the neural network (hereinafter, a detection learning model) for detection of presence or absence of an abnormality predictor. With these series of processes relating to learning, the abnormality predictor detection unit 110 can determine presence or absence of an abnormality predictor using the in-cylinder pressure data of the obtained state data. Although it is assumed to use DNN here as a learning method, other methods may be used as long as the same effect can be obtained.

Next, the abnormality predictor detection unit 110 records the detection learning model obtained in step 207 in the detection learning model database 107 (step 208). Thereafter, the controller 103 determines whether an instruction to end the abnormality predictor detection process has been received via the input device or the like (step 215), and ends the process (step 202) if it is determined that the instruction to end the process has been received (step 215; Yes). On the other hand, if it is determined that the instruction to end the process has not been received (step 215; No), the controller 103 returns to step 203 and repeats the subsequent processes. The process relating to the learning of the abnormality predictor detection unit 110 in the pre-learning phase has been described as above.

Figure 4:
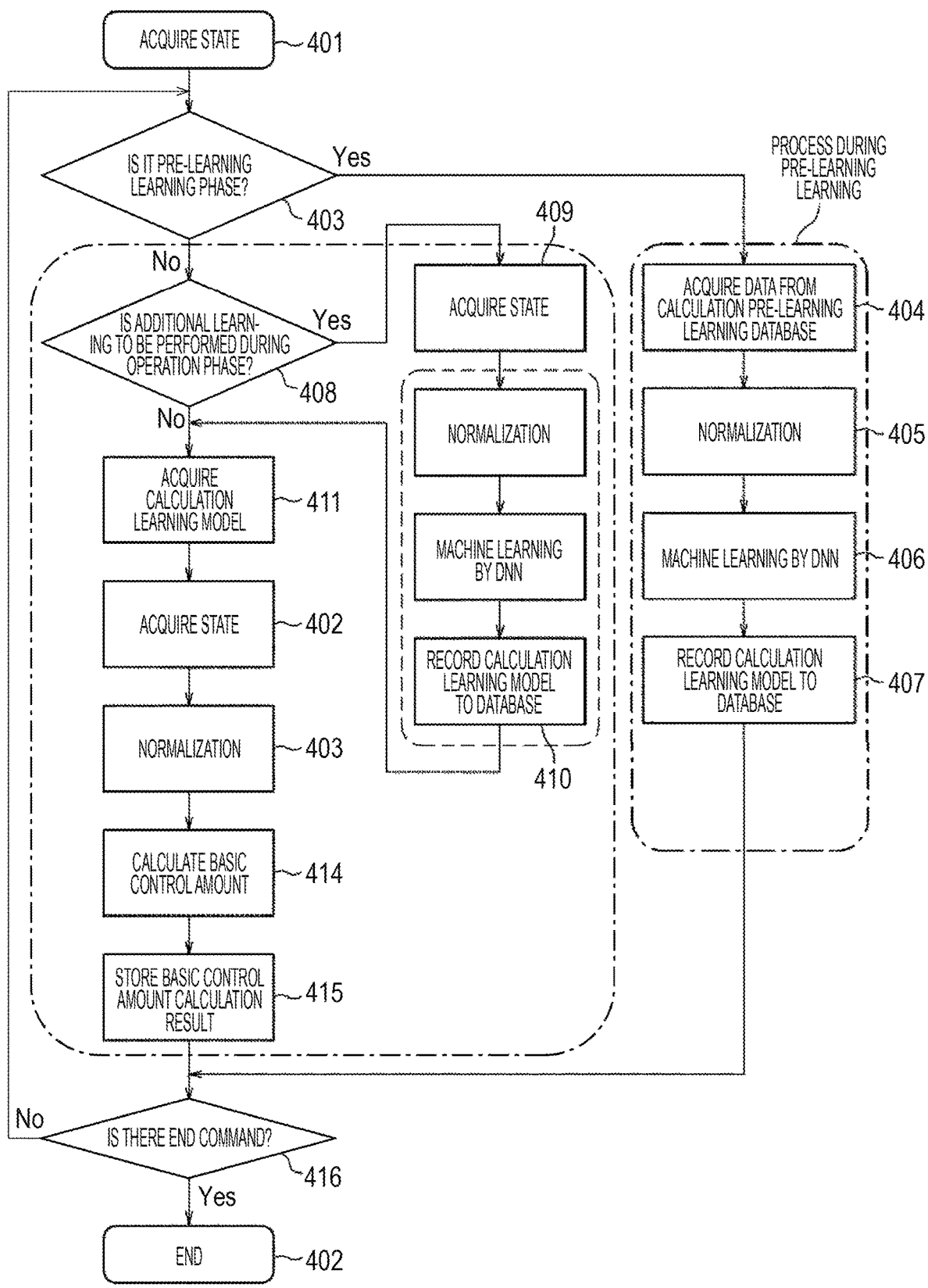
FIG. 4 is a flowchart illustrating a procedure of a process executed by a basic control amount calculation unit.

Next, the processing of the basic control amount calculation unit 113 will be described. FIG. 4 illustrates the processing of the basic control amount calculation unit 113. When receiving an instruction to start a process of calculating a basic control amount via the input device or the like (step 401), the controller 103 executes a selection process to determine whether it is the pre-learning phase or the operation phase (step 403). When the controller 103 determines that it is the pre-learning phase (step 403; Yes), the basic control amount calculation unit 113 acquires data from the calculation pre-learning database 108 as step 404. On the other hand, when it is determined that the phase is not the pre-learning phase (step 403; No), the controller 103 executes processes of step 408 and the subsequent steps, and these processes will be described later.

Figure 5:
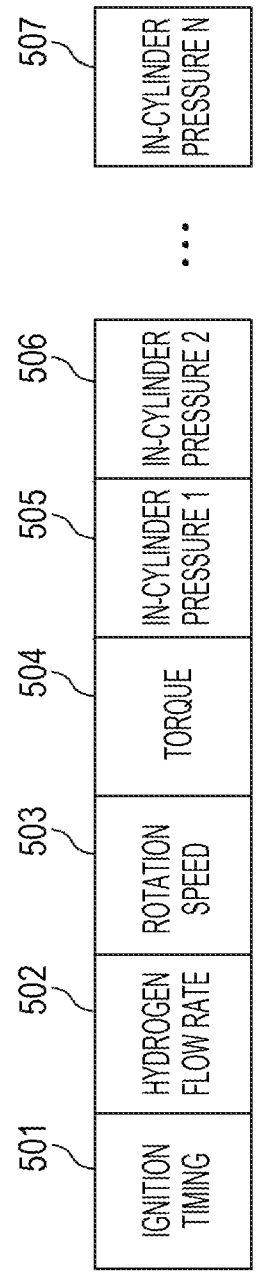
FIG. 5 is an example of calculation pre-learning DB.
Figure 6:
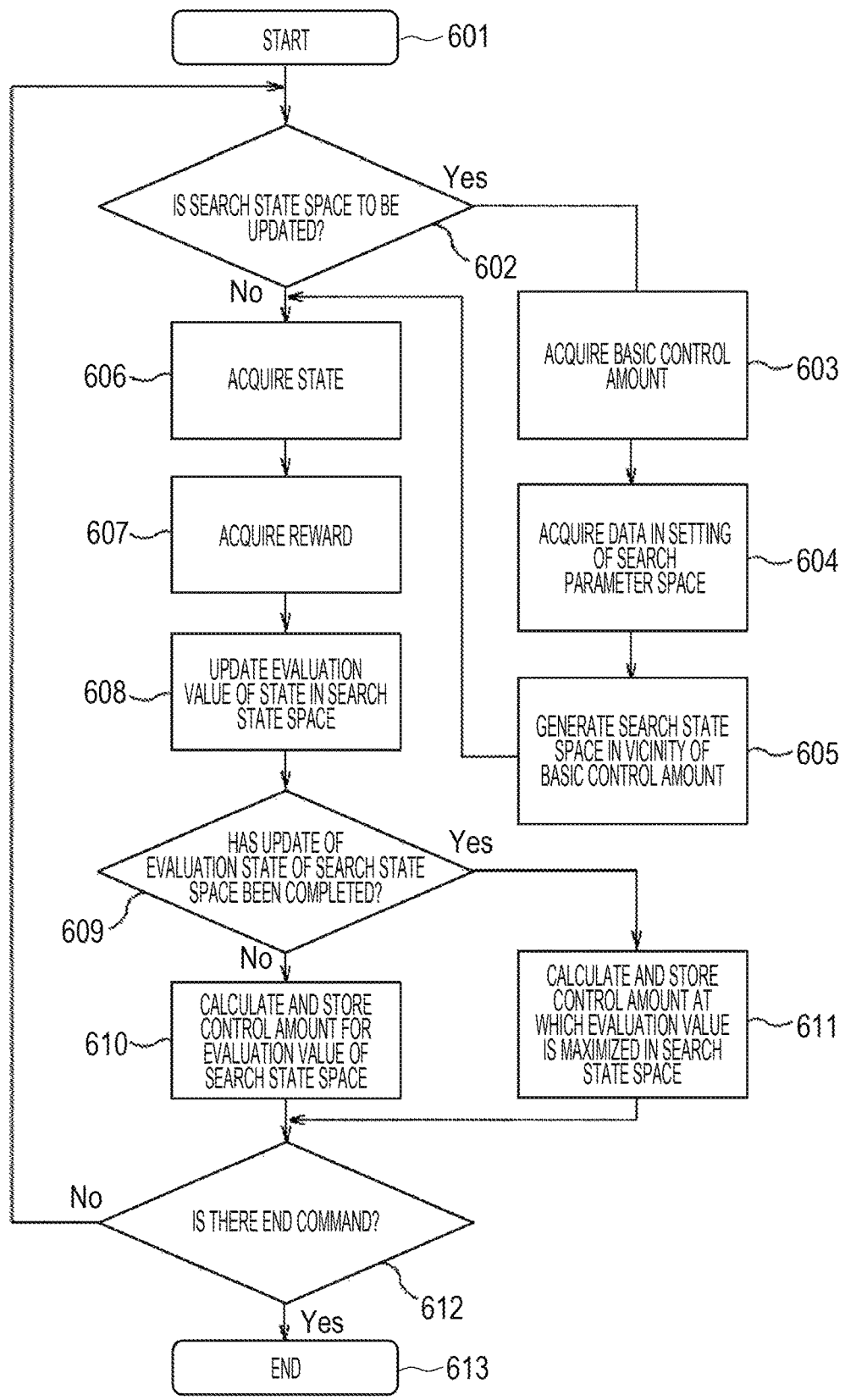
FIG. 6 is a flowchart illustrating a procedure of a process executed by the control amount search unit.

Here, a data example of the calculation pre-learning database 108 is illustrated in FIG. 5. As illustrated in FIG. 5, state data 502 to 507, similar to the state data 302 to 307 illustrated in FIG. 3, and a control amount for each control parameter (for example, an ignition timing) set at a time when the state data is obtained are stored in association with each other as the data stored in the calculation pre-learning database 108. The state data here is data on a state obtained by measuring the engine in the system 101 with the sensor unit 102. The state data records data corresponding to temporal changes in combustion pressure for one cycle of combustion of the engine, such as a hydrogen flow rate 502, rotation speed 503, torque 504, an in-cylinder pressure 505 to an in-cylinder pressure 507 (in-cylinder pressures 1 to N), as data for each cycle of combustion of the engine, which is similar to the detection pre-learning database 106 illustrated in FIG. 3. In addition, an ignition timing 501 is recorded as the control amount set at a time when these pieces of data are obtained. Although only data corresponding to one cycle of combustion of the engine is illustrated in the state data 502 to 507, it is assumed that data corresponding to a plurality of cycles obtained by preliminary trial operations or the like is recorded in the database in the same manner.

Next, the basic control amount calculation unit 113 executes a normalization process 405 on the state data other than the ignition timing 501 with respect to the data obtained so far (step 405). As a result, sizes of data and the like are aligned according to a specific rule.

Next, the basic control amount calculation unit 113 executes a process relating to learning of basic control amount calculation by the DNN (step 406). Herein, it is assumed that a neural network for regression is configured in the basic control amount calculation unit 113. Here, a so-called learning process is performed by inputting the hydrogen flow rate 502, the rotation speed 503, the torque 504, and the in-cylinder pressure 505 to the in-cylinder pressure 507 (in-cylinder pressures 1 to N), which are the state data, to the neural network, and using a difference between an output value obtained by the neural network based on this input and the ignition timing 501 corresponding to the input state data to update the neural network such that this difference becomes small, thereby obtaining a model of the neural network (hereinafter, a calculation learning model) for calculation of the ignition timing here as the basic control amount. Although it is assumed to use DNN here as a learning method, other methods may be used as long as the same effect can be obtained.

Next, the basic control amount calculation unit 113 records the calculation learning model obtained in step 407 in the calculation learning model database 109. Thereafter, the controller 103 determines whether an instruction to end the basic control amount calculation process has been received via the input device or the like (step 416), and ends the process (step 402) if it is determined that the instruction to end the process has been received (step 416; Yes). On the other hand, if it is determined that the instruction to end the process has not been received (step 416; No), the controller 103 returns to step 403 and repeats the subsequent processes. The process relating to the learning of the basic control amount calculation unit 113 in the pre-learning phase has been described as above.

As above, the learning using the database is performed for each of the abnormality predictor detection unit 110 and the basic control amount calculation unit 113, and the pre-learning phase is completed.

Next, the operation phase will be described. In the operation phase, the system 101 is controlled using the detection learning model and the calculation learning model obtained in the pre-learning phase.

Flow of basic processing will be described with reference to FIG. 1. First, it is assumed that the hydrogen flow rate, the rotation speed, the torque, and the in-cylinder pressure, which are the state data, are measured at predetermined time intervals in accordance with a combustion cycle of the engine in the sensor unit 102. In addition, it is assumed that data on relating to the state of the system 101 is obtained based on sensor data acquired by the sensor unit 102 in the observation unit 104. For example, it is assumed that the observation unit 104 performs processing according to a specific rule, such as conversion of successive data into appropriate discrete data. Incidentally, the observation unit 104 may use the sensor data directly as state data in the subsequent processes. The observation unit 104 outputs the state data to the abnormality predictor detection unit 110, the reward calculation unit 111, and the basic control amount calculation unit 113.

In the operation phase, the abnormality predictor detection unit 110 first acquires the detection learning model obtained in the pre-learning phase as preparation for detection of an abnormality predictor (step 209). Next, the abnormality predictor detection unit 110 acquires the state data obtained by the observation unit 104 (step 210).

Next, the abnormality predictor detection unit 110 executes the short-time Fourier transform on the acquired state data in the same manner as the process in the pre-learning phase (step 211) to execute normalization (step 212). As a result, FFT data is obtained in the same manner as in the pre-learning phase.

Next, the abnormality predictor detection unit 110 inputs the FFT data to the detection learning model, and detects an abnormality predictor (step 213). The detection learning model learns the process of determining presence or absence of an abnormality predictor in the pre-learning phase for FFT data, and the presence or absence of an abnormality predictor is obtained as a result. When an abnormality has been detected, "1" is stored as an abnormality predictor detection result in the memory, and when no abnormality is detected, "0" is stored in the memory (step 214).

The reward calculation unit 111 calculates a reward based on the abnormality predictor detection result stored in the memory (step 216). Here, the reward is information to determine pass or fail regarding a state reached by the system 101 (here, the state obtained by measuring the system 101) by performing predetermined control on the system 101. Here, it is assumed that a negative reward is assigned when the abnormality predictor detection unit 110 determines that there is an abnormality predictor. Incidentally, it is assumed that, when the abnormality predictor detection unit 110 determines that there is no abnormality predictor and an increase rate of thermal efficiency calculated from data relating to the state is positive, a positive reward proportional to such a state is assigned. Thereafter, the controller 103 determines whether an instruction to end the abnormality predictor detection process has been received via the input device or the like (step 215), and ends the process (step 202) if it is determined that the instruction to end the process has been received (step 215; Yes). On the other hand, if it is determined that the instruction to end the process has not been received (step 215; No), the controller 103 returns to step 203 and repeats the subsequent processes.

First, the basic control amount calculation unit 113 acquires the calculation learning model obtained in the pre-learning phase as preparation of basic control amount calculation (step 411). This process is executed after the basic control amount calculation unit 113 determines in step 408 whether to perform additional learning in the operation phase.

Next, when it is determined that no additional learning is to be performed during the operation phase (step 408; No), the basic control amount calculation unit 113 acquires data relating to the state obtained by the observation unit 104 (step 412). Next, the basic control amount calculation unit 113 executes normalization on the acquired data relating to the state in the same manner as in the pre-learning phase (step 413). Thus, the normalized data relating to the state is obtained. Next, the basic control amount calculation unit 113 inputs the normalized data relating to the state to the calculation learning model and calculates the basic control amount (step 414). As a result, a result of the basic control amount calculation (hereinafter, a basic control amount calculation result) is obtained.

For example, a control amount (for example, an ignition timing during the operation in the relevant state) obtained as an output result of the calculation pre-learning model with the input of the hydrogen flow rate, the rotation speed, the torque, the in-cylinder pressures 1 to N, as the state data, to the calculation pre-learning model obtained in the process (step 407) relating to the learning of basic control amount calculation using the DNN by the basic control amount calculation unit 113 is output as the basic control amount calculation result. The basic control amount calculation unit 113 stores the output control amount as the basic control amount in the memory (step 415).

When it is determined that additional learning is to be performed during the operation phase (step 408; Yes), the basic control amount calculation unit 113 acquires data relating to the state obtained by the observation unit 104 (step 409) similarly to step 412. Thereafter, the basic control amount calculation unit 113 performs normalization, machine learning using the DNN, and recording of the calculation learning model (step 410), which is similar to each process from steps 405 to 407. Since the machine learning using the DNN is also performed during the operation to generate the calculation learning model by executing the processes of steps 409 and 410, a control amount that needs to be controlled by the system 101 can be search with high accuracy in the search for the control amount to be described later.

When the basic control amount calculation result is stored in the memory by the basic control amount calculation unit 113, the control amount search unit 112 starts processing (step 601), and first, determines presence or absence of update of a search space (step 602). Here, the search space is a discrete space set to search for a control amount that makes an evaluation value of the system 101 larger using the basic control amount as a reference. As will be described hereinafter, the control amount search unit 112 searches for a control amount to control the system 101 within a search space generated with the basic control amount as a reference, and thus, it is possible to efficiently set these values out of enormous candidates.

Here, it is assumed that no search space has been generated, or it is desired to stop using the existing search space and generate a search space again. In this case, the control amount search unit 112 determines to update the search space (step 602; Yes), and acquires the basic control amount (step 603). As a result, the basic control amount such as the ignition timing output in step 414 is obtained.

Next, as the setting of the search space, the control amount search unit 112 acquires data, such as a maximum value and a minimum value of a search range when searching the control amount using the basic control amount as a reference, and a pitch width of search, for example, from a user interface and a setting file as setting of the search space (step 604). Next, the control amount search unit 112 uses the data on the setting of the search space and the basic control amount to generate a search space in the vicinity of the basic control amount with reference to the basic control amount acquired in step 603, (step 605). A range of the control amount and a range of the state are required in order to generate the search space. First, the control amount range is generated as an array in which an evaluation value is recorded at a constant pitch width from predetermined minimum value to maximum value with the above-described basic control amount as the center, for example, for the control amount of ignition timing. In addition, a range for each data constituting the state data is obtained, for example, in the calculation pre-learning database 109, and thus, the state range is generated as an array in which an evaluation value is recorded at a constant pitch width from a minimum value to a maximum value thereof. The search space is generated based on these ranges. Incidentally, the control amount search unit 112 resets an evaluation value to zero at a point in time of generating the search space.

FIG. 7 is a view illustrating an example of the search space. In FIG. 7, for example, M states of states 0 to M and N control amounts of control amounts 0 to N are stored, and evaluation values (evaluation value 00 to MN) for each combination of each state and each control amount are stored in the memory. Next, the control amount search unit 112 acquires data on a current state obtained by the observation unit 104 (step 606). Next, the control amount search unit 112 acquires a reward (step 607). Since the reward for each state has been calculated in step 216 illustrated in FIG. 2, the control amount search unit 112 may read the reward corresponding to the current state from the memory.

Next, the control amount search unit 112 updates an evaluation value by recording the reward in an evaluation value at a point in the search space to which the above-described data on the current state corresponds (step 608). For example, the control amount search unit 112 refers to the search space illustrated in FIG. 7, and updates, when the data on the current state is in "state 0" and the control amount set under this state is "control amount 1", "evaluation value 01" corresponding to such data and control amount with the reward obtained in step 607. In this manner, if it is determined that there is an abnormality predictor under a certain control amount, a negative reward is added as an evaluation value, and if there is no abnormality predictor and an increase rate of thermal efficiency is positive, a positive reward proportional to such a state is added as an evaluation value in step 608.

Next, the control amount search unit 112 determines whether the update of the evaluation value in the search space using the data relating to the current state has been completed (step 609). If the update of the evaluation value in the search space has not been completed, that is, if it is determined that there is a control amount at which an evaluation value is zero in the search space (step 609; No), the control amount search unit 112 determines that the control of the system 101 has not been attempted with the control amount at which the evaluation value is zero. Therefore, the control amount search unit 112 searches for the control amount by referring to the search space illustrated in FIG. 7, sets the searched control amount as the control amount of the system 101, and stores the set control amount and a control parameter for execution of control of the system 101 in accordance with the control amount in the memory in association with each other (step 610). When receiving the control amount and the control parameter, the control unit 105 converts the control amount and the control parameter into command values that can be processed by the engine in the system 101, and controls the system 101.

On the other hand, if it is determined that the update of the evaluation value in the search space has been completed, that is, if it is determined that there is no control amount at which the evaluation value is zero (step 609; Yes), the control amount search unit 112 determines that the search of the search range in the search space has been completed. Therefore, the control amount search unit 112 sets a control amount at which an evaluation value is maximized in the search range, that is, a reward is maximized, as the control amount of the system 101, and stores the set control amount and a control parameter for execution of control of the system 101 in accordance with the control amount in the memory in association with each other (step 611). Here, although it is assumed here that all the control amounts within the search range are attempted, another method of attempting several candidates at random and searching the periphery of a control amount with a maximum evaluation value among the candidates in more detail may be used as a search method for a control amount. Although the control amount at which the reward is maximized is set as the control amount of the system 101 during the operation in the present example, it is not always necessary to be the control amount at which the reward is maximized. For example, a condition (for example, a threshold) serving as a reference for a reward may be provided, the control amount search unit 112 may determine whether an output of the system 101 satisfies the reference, and a control amount for satisfying the reference when it is determined that the reference is satisfied may be set as a control amount that needs to be satisfied by the system 101. That is, the control amount search unit 112 may store a control amount that satisfies a reward equal to or larger than a certain threshold and a control parameter for execution of control in accordance with the control amount in the memory in association with each other.

In the above embodiment, a series of processes in each unit of the controller 103 may be selected or omitted depending on an embodiment. In addition, data may be generated by a simulator simulating the operation of the system and the generated data may be used as learning data to be used in the pre-learning phase. In addition, the simulator may be incorporated in the controller, or may operate in an external system different from the system 101 in FIG. 1 and data may be sent to the system in FIG. 1 by communication.

In this manner, in the present embodiment, the observation unit 104 calculates the amount relating to a state based on the state of the control target (for example, the engine) detected by the sensor unit 102, and the abnormality predictor detection unit 110 detects an abnormality predictor of the control target by inputting the amount relating to the state into the detection learning model 107. In addition, the reward calculation unit 111 calculates the reward which is the amount obtained by evaluating the pass or fail of the operation of the control target based on the detection result of the abnormality predictor, and the basic control amount calculation unit 113 calculates the basic control amount serving as the reference to control the control target based on the control amount during the operation obtained at a time when the data relating to the state during the operation is input into the calculation learning model. Further, the control amount search unit 112 searches for the control amount at which the reward satisfies the predetermined condition based on the basic control amount, the above-described data relating to the state during the operation, and the reward, and outputs the searched control amount, and the control unit 105 generates the command value to the control target based on the searched control amount. Therefore, it is possible to reduce the time and effort for adjusting the control amount for each control parameter necessary for power generation.

In addition, for the purpose of realizing power generation using various types of fuel, it is possible to provide an artificial intelligence (AI) unit for an engine that automatically adjusts control parameters necessary for power generation using an inexpensive sensor and AI. Although the description has been given as above assuming that the engine is used as the prime mover and the invention is used for power generation, it is obvious that the invention can be used not only for the power generation but also in the case of obtaining torque required for transportation.

What is claimed is:

1. A control device comprising:
an observation unit that calculates an amount relating to a state of a control target detected by a sensor based on the state;
an abnormality predictor detection unit that detects an abnormality predictor of the control target based on an output obtained at a time when the amount relating to the state is input to a detection learning model;
a reward calculation unit that calculates a reward which is an amount obtained by evaluating pass or fail of an operation of the control target based on a detection result of the abnormality predictor;
a basic control amount calculation unit that calculates data relating to the state during an operation and a basic control amount serving as a reference to control the control target by inputting the data on the state during the operation into a calculation learning model;
a control amount search unit that searches for a control amount at which the reward satisfies a predetermined condition based on the basic control amount, the data relating to the state during the operation and the reward and outputs the searched control amount and the control amount to execute control in accordance with the control amount; and
a control unit that generates a command value to the control target based on the searched control amount and the control amount to execute control in accordance with the control amount.

2. The control device according to claim 1, wherein
the observation unit calculates an amount relating to a state of an in-cylinder pressure of an engine, which is the control target, detected by the sensor,
the abnormality predictor detection unit detects an abnormality predictor of the in-cylinder pressure of the engine based on the amount relating to the state of the in-cylinder pressure of the engine and the control amount, and
the basic control amount calculation unit calculates the basic control amount based on data relating to the state of the in-cylinder pressure of the engine during the operation and the control amount during the operation.

3. The control device according to claim 2, wherein
the abnormality predictor detection unit inputs the amount relating to the state of the cylinder internal pressure of the engine into the detection learning model, configured using a neural network, and detects an abnormality predictor of the control target using the control amount obtained by the input.

4. The control device according to claim 2, wherein
the basic control amount calculation unit inputs data relating to a state of the engine during the operation into the calculation learning model, configured using a neural network, and calculates the basic control amount using the control amount obtained by the input.

5. The control device according to claim 2, wherein
the control amount search unit uses the basic control amount as a reference to generate a search space in which data relating to the state during the operation and the control amount in the state during the operation are associated with each other and search for a control amount at which the reward satisfies a predetermined condition within the generated search space.

6. The control device according to claim 1, wherein
the reward calculation unit calculates a negative reward as the evaluated amount when the detection result of the abnormality predictor indicates an abnormality, and calculates a positive reward as the evaluated amount when the detection result of the abnormality predictor indicates no abnormality.

7. The control device according to claim 3, wherein
the abnormality predictor detection unit inputs a power spectrum, obtained by performing Fourier transform of data relating to the state of the in-cylinder pressure of the engine, to the detection learning model configured using a neural network, and detects an abnormality predictor of the control target using an amount obtained by the input.

8. A control method comprising:
calculating an amount relating to a state of a control target detected by a sensor based on the state;

detecting an abnormality predictor of the control target based on an amount obtained at a time when the amount relating to the state is input to a detection learning model;

calculating a reward which is an amount obtained by evaluating pass or fail of an operation of the control target based on a detection result of the abnormality predictor;

calculating a basic control amount serving as a reference to control the control target based on a control amount during an operation obtained at a time when data relating to the state during the operation is input to a calculation learning model;

searching for a control amount at which the reward satisfies a predetermined condition based on the basic control amount, the data relating to the state during the operation, and the reward;

outputting the searched control amount and a control parameter for execution of control based on the control amount; and generating a command value to the control target based on the searched control amount and the control parameter.

9. A control program on a non-transitory tangible computer readable medium that causes a computer to execute:

calculating an amount relating to a state of a control target detected by a sensor based on the state;

detecting an abnormality predictor of the control target based on an amount obtained at a time when the amount relating to the state is input to a detection learning model;

calculating a reward which is an amount obtained by evaluating pass or fail of an operation of the control target based on a detection result of the abnormality predictor;

calculating a basic control amount serving as a reference to control the control target based on a control amount during an operation obtained at a time when data relating to the state during the operation is input to a calculation learning model;

searching for a control amount at which the reward satisfies a predetermined condition based on the basic control amount, the data relating to the state during the operation, and the reward, and outputting the searched control amount and a control parameter for execution of control based on the control amount; and generating a command value to the control target based on the searched control amount and the control parameter.

* * * * *